United States Patent
Pietzsch et al.

(10) Patent No.: US 12,049,226 B2
(45) Date of Patent: Jul. 30, 2024

(54) DRIVER ASSISTANCE SYSTEMS

(71) Applicant: ARRIVER SOFTWARE AB, Linkoping (SE)

(72) Inventors: Sylvia Pietzsch, Billdal (SE); Christina Lichtenthaeler, Erding (DE); Ajay Prasanna, Karlsfeld (DE)

(73) Assignee: Arriver Software AB, Linköping (SE)

( * ) Notice: Subject to any disclaimer, the term of this patent is extended or adjusted under 35 U.S.C. 154(b) by 47 days.

(21) Appl. No.: 16/482,544

(22) PCT Filed: Feb. 12, 2018

(86) PCT No.: PCT/EP2018/053459
§ 371 (c)(1),
(2) Date: Jul. 31, 2019

(87) PCT Pub. No.: WO2018/146314
PCT Pub. Date: Aug. 16, 2018

(65) Prior Publication Data
US 2020/0001879 A1 Jan. 2, 2020

(30) Foreign Application Priority Data
Feb. 13, 2017 (EP) .................... 17155916

(51) Int. Cl.
*B60W 40/06* (2012.01)
*B60W 30/18* (2012.01)
(52) U.S. Cl.
CPC ............ *B60W 40/06* (2013.01); *B60W 30/18* (2013.01); *B60W 2520/14* (2013.01);
(Continued)

(58) Field of Classification Search
CPC ............ B60W 30/18; B60W 2552/53; B60W 2552/10
See application file for complete search history.

(56) References Cited

U.S. PATENT DOCUMENTS

| | | | |
|---|---|---|---|
| 7,720,580 | B2 | 5/2010 | Higgins-Luthman |
| 7,877,175 | B2 | 1/2011 | Higgins-Luthman |

(Continued)

FOREIGN PATENT DOCUMENTS

| | | |
|---|---|---|
| CN | 104670229 A | 6/2015 |
| DE | 102014205127 A1 | 10/2014 |

(Continued)

OTHER PUBLICATIONS

International Search Report and Written Opinion of PCT/EP2018/053459 dated May 9, 2018.

(Continued)

*Primary Examiner* — Imran K Mustafa
(74) *Attorney, Agent, or Firm* — Arriver Software AB

(57) ABSTRACT

A driver assistance apparatus being configured to generate a list of objects, each object being located in a vicinity of the vehicle and each object having been identified using data from at least one object sensor on the vehicle. The apparatus also searches for lane markings on a road on which the vehicle travels using data from at least one lane marking sensor on the vehicle. Finally, a region of interest ("ROI") is established on the basis of at least one detected lane marking, wherein the ROI includes an ROI ego lane, an ROI left lane and an ROI right lane. A corresponding method is also provided.

26 Claims, 13 Drawing Sheets

(52) U.S. Cl.
CPC ..... *B60W 2540/18* (2013.01); *B60W 2552/00* (2020.02); *B60W 2552/53* (2020.02); *B60W 2554/80* (2020.02)

(56) References Cited

U.S. PATENT DOCUMENTS

| | | | |
|---|---|---|---|
| 7,991,522 B2 | 8/2011 | Higgins-Luthman | |
| 8,116,929 B2 | 2/2012 | Higgins-Luthman | |
| 8,239,086 B2 | 8/2012 | Higgins-Luthman | |
| 8,386,114 B2 | 2/2013 | Higgins-Luthman | |
| 8,543,277 B2 | 9/2013 | Higgins-Luthman | |
| 9,014,904 B2 | 4/2015 | Higgins-Luthman | |
| 9,193,303 B2 | 11/2015 | Higgins-Luthman | |
| 9,280,899 B2 | 3/2016 | Biess et al. | |
| 9,940,528 B2 | 4/2018 | Higgins-Luthman | |
| 2006/0184297 A1 | 8/2006 | Higgins-Luthman | |
| 2010/0076684 A1* | 3/2010 | Schiffmann | G01S 13/867 701/301 |
| 2014/0177914 A1* | 6/2014 | Kuehnle | G06T 7/60 382/103 |
| 2015/0046078 A1* | 2/2015 | Biess | G08G 1/163 701/301 |
| 2016/0078305 A1 | 3/2016 | Higgins-Luthman | |
| 2017/0025017 A1* | 1/2017 | Thomas | G06V 10/809 |
| 2017/0101097 A1* | 4/2017 | Buchner | B60W 30/16 |
| 2017/0336629 A1* | 11/2017 | Suzuki | G05D 1/0253 |
| 2018/0001894 A1* | 1/2018 | Masui | B60W 10/06 |
| 2018/0154825 A1* | 6/2018 | Tanaka | G06V 20/58 |
| 2019/0016339 A1* | 1/2019 | Ishioka | B60W 40/04 |

FOREIGN PATENT DOCUMENTS

| | | |
|---|---|---|
| DE | 102014200638 A1 | 7/2015 |
| DE | 10 2014 212 478 A1 | 12/2015 |

OTHER PUBLICATIONS

Search Report in CN App. No. 201880007840.7; dated Nov. 12, 2021.

European Search Report—EP17155916—Search Authority—Munich—Aug. 7, 2017.

* cited by examiner

DRIVER ASSISTANCE SYSTEMS

CROSS-REFERENCE TO RELATED APPLICATIONS

This application is a 35 U.S.C. § 371 national phase of PCT International Application No. PCT/EP2018/053459, filed Feb. 12, 2018, which claims the benefit of priority under 35 U.S.C. § 119 to European Patent Application No. 17155916.4, filed Feb. 13, 2017, the contents of which are incorporated herein by reference in their entirety.

FIELD OF THE INVENTION

The present invention relates to a driver assistance system, and more particularly relates to an apparatus for a driver assistance system for determining lanes, and to a related method.

BACKGROUND

In order that accidents are avoided and driving laws are complied with, driving a motor vehicle on a road requires concentration from the driver, often for prolonged periods. Lapses in concentration from the driver lead to increased risk of accidents and/or non-compliance with the law. Increasingly, driver assistance systems that are capable of performing an assistance function are fitted to the driver's vehicle (the "ego vehicle"). For example, the assistance function may include relieving the driver of some of his/her driving duties, or may include monitoring the driver's performance in order that errors may be anticipated and/or avoided.

Alternatively, the assistance function may introduce some additional functionality not ordinarily available to a driver. Such additional functionality may allow the driver to have more information that they ordinarily would do, in order that they can perform a driving task more easily, for example. A rear-facing camera, which can provide a video feed to a driver when reversing, constitutes an example of such an additional functionality. In this example, the video feed allows the driver to reverse-park more easily and safely but is not actually necessarily monitoring the driver's performance or performing some task for them.

Driver assistance systems therefore mitigate risk for the driver of the ego vehicle, his/her passengers, and other road users. Ultimately, it is thought that driver assistance functions will be developed to such an extent that they can control most, if not all, aspects of driving an ego vehicle. In this case, the driver assistance systems will be an autonomous driving system.

Driver assistance systems may include active devices, which are capable of actively intervening in the operation of the ego vehicle, for example by changing the speed of the ego vehicle. Driver assistance systems may alternatively or additionally include passive devices, which, for example, notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor may measure parameters of the vehicle or its surroundings. The data from such a sensor is processed in order to draw conclusions based on the sensor measurements. The driver assistance system may then trigger some interaction with the ego vehicle, or with the driver, based on the result of the conclusions.

Examples of potential sensors used in driver assistance systems include RADAR systems, LIDAR systems, cameras, inter-vehicle communications, and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. The sensor is able to determine the distance to the vehicle ahead. The driver assistance system also knows, and can control, the velocity of the ego vehicle. The driver assistance system controls the speed of the ego vehicle in order to maintain a predefined safety condition relative to the vehicle ahead. For example, the driver assistance system may control the speed to maintain a certain distance between the ego vehicle and the vehicle ahead. Alternatively, the driver assistance system may control the speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the user of potential hazards. For example, the ego vehicle changing lanes when a second vehicle is in a blind spot, or detecting a second vehicle cutting-in to the path of the ego vehicle, may be notified to a driver. The situational awareness may also be used as an input to an ACC system, for example.

When monitoring the surrounding of the ego vehicle a number of vehicles and entities may be identified near the ego vehicle. It is important to select which, if any, of these vehicles or entities should be used as the basis for action from the vehicle systems or for notifying to the driver.

Providing a detailed and reliable situational awareness is important for a number of different driver assistance functionalities.

In the majority of driving situations, vehicles are travelling in prescribed lanes. That is, the road is split into a number of generally parallel lanes, each of which forms a corridor along which vehicles should travel. Sometimes the lanes are designated by road markings on the road surface, which visually indicate to a driver where the boundaries of the lanes are. Sometimes there are no road markings, and the driver simply has to take care not to stray into a lane of oncoming traffic. Sometimes the lane markings change along a particular section of road. For example, when work is being done to a road, the lanes may be narrowed relative to their normal configuration.

In situations where the lane markings are obscured from view (for example, by snow or congested and somewhat chaotic traffic), or where road markings are not present, it is not possible for a driver assistance system to identify the position and dimensions of the lanes by processing the output of a camera, for example. Lane markings may also be obscured by other vehicles or objects, or simply the camera is not able to distinguish visually the lane markings beyond a certain distance from the ego vehicle.

It is an object of the invention to provide an improved apparatus for a driver assistance system and method of operating an apparatus for a driver assistance system, which seeks to address some or all of these issues.

According to a first aspect of the present invention, there is provided an apparatus for a motor vehicle driver assistance system, the apparatus being configured to: generate a list of objects, each object being located in a vicinity of the vehicle, each object having been identified using data from at least one object sensor on the vehicle; search for lane markings on a road on which the vehicle travels using data from at least one lane marking sensor on the vehicle, and; establish a region of interest ("ROI") on the basis of at least one detected lane marking, wherein establishing the ROI includes: generating an ROI ego lane, the vehicle being located in the ROI ego lane; generating an ROI left lane on a left side of the ROI ego lane, and generating an ROI right lane on a right side of the ROI ego lane.

Preferably, the apparatus is further configured to assign at least one of the objects to one of the ROI ego lane, ROI left lane, and ROI right lane.

Advantageously, the apparatus is further configured to generate a VIO candidate list including at least one Very Important Object ("VIO") chosen from the assigned objects.

Conveniently, the VIO candidate list contains the closest object to the vehicle in each of a plurality of regions.

Preferably, the VIO candidate list contains at least one VIO identified as a lane-changing object.

Advantageously, each region is a section of one of the ROI ego lane, the ROI right lane, or the ROI left lane.

Conveniently, the apparatus is configured to send the VIO candidate list to at least one Advanced Driving Assistance Apparatus ("ADAS").

Preferably, in the event that exactly one lane marking is identified, the location of the ego lane is based on the exactly one lane marking.

Advantageously, each of the ROI left lane and the ROI right lane are a replication of the ROI ego lane with a respective lateral offset from the ROI ego lane.

Conveniently, in the event that an outer lane marking is identified, the location of one of the ROI left lane or the ROI right lane is based on the position of the outer lane marking.

Preferably, the apparatus is further configured to establish the ROI on the basis of vehicle parameters in the event that no lane markings are identified.

Advantageously, the vehicle parameters include at least one of vehicle velocity, steering angle, and yaw rate.

Preferably, the vehicle parameters include the steering angle.

Advantageously, the vehicle parameters include the yaw rate and the vehicle velocity.

Conveniently, each object includes a position of the object relative to the vehicle.

According to a second aspect of the present invention, there is provided a method for a motor vehicle driver assistance system, the method including the steps of: generating a list of objects, each object being located in a vicinity of the vehicle, each object having been identified using data from at least one object sensor on the vehicle; searching for lane markings on a road on which the vehicle travels using data from at least one lane marking sensor on the vehicle, and; establishing a region of interest ("ROI") on the basis of at least one detected lane marking, wherein establishing the ROI includes: generating an ROI ego lane, the vehicle being located in the ROI ego lane; generating an ROI left lane on a left side of the ROI ego lane, and generating an ROI right lane on a right side of the ROI ego lane.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
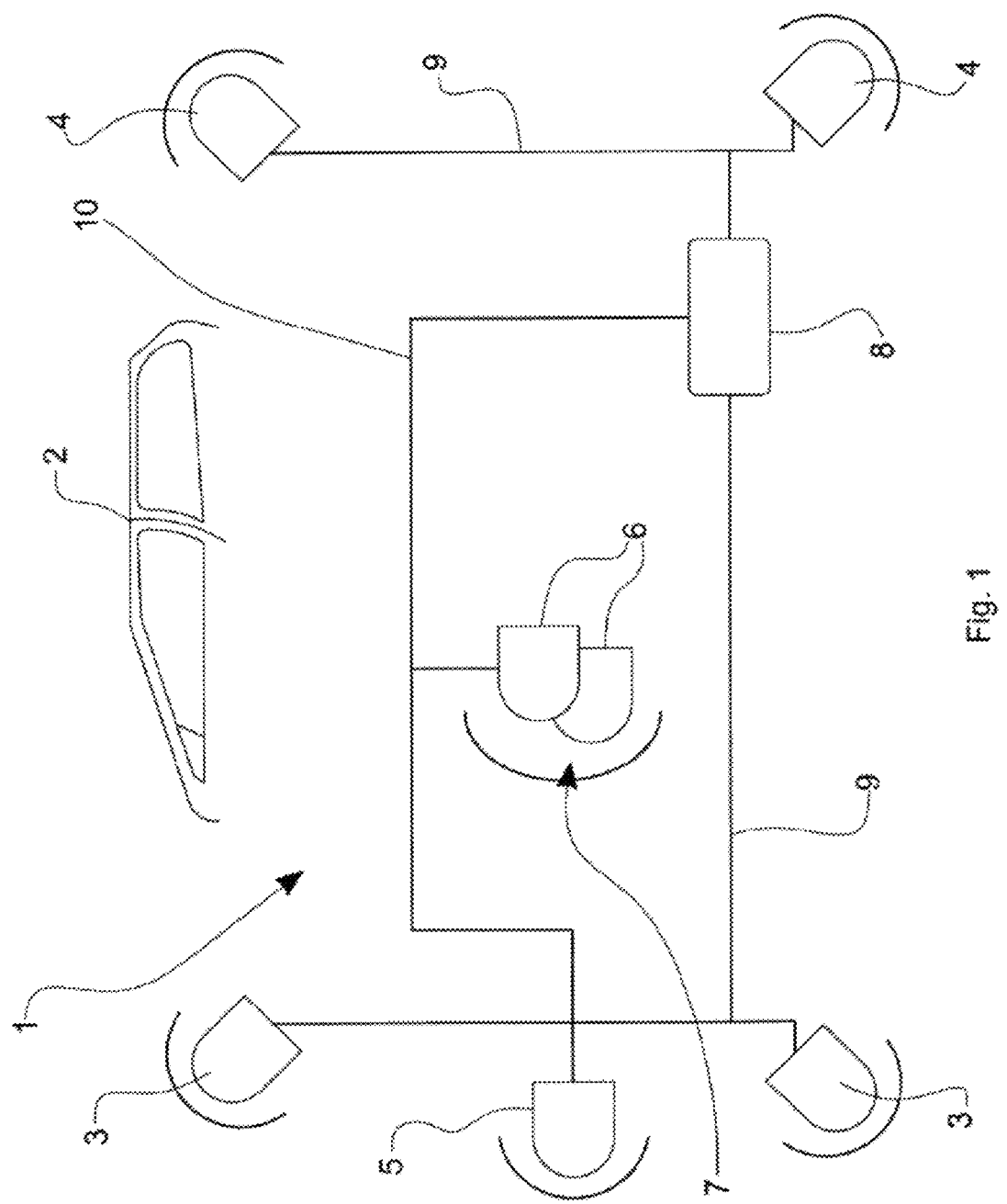
FIG. 1 shows a vehicle with a driver assistance system of a type suitable for use with the present invention.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The safety system 1 includes a number of different types of sensor mounted at appropriate positions on the ego vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed longrange radar ("LRR") sensor 5 mounted centrally at the front of the vehicle 2, and a pair of generally forwardly directed optical sensors 6 forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the central control unit 8 via a conventional Controller Area Network ("CAN") bus 9, and the LRR sensor 5 and the sensors of the SVS 7 are connected to the central control unit 8 via a faster FlexRay serial bus 9, also of a type known per se.

Collectively, and under the control of the control unit 8, the various sensors 3-6 can be used to provide a variety of different types of driver assistance functionalities such as, for example: blind spot monitoring; adaptive cruise control; collision prevention assist; lane departure protection; and rear collision mitigation. Such systems may be referred to as Advanced Driver Assistance Systems ("ADAS"). Such systems form part of an autonomous driving system.

Figure 2:
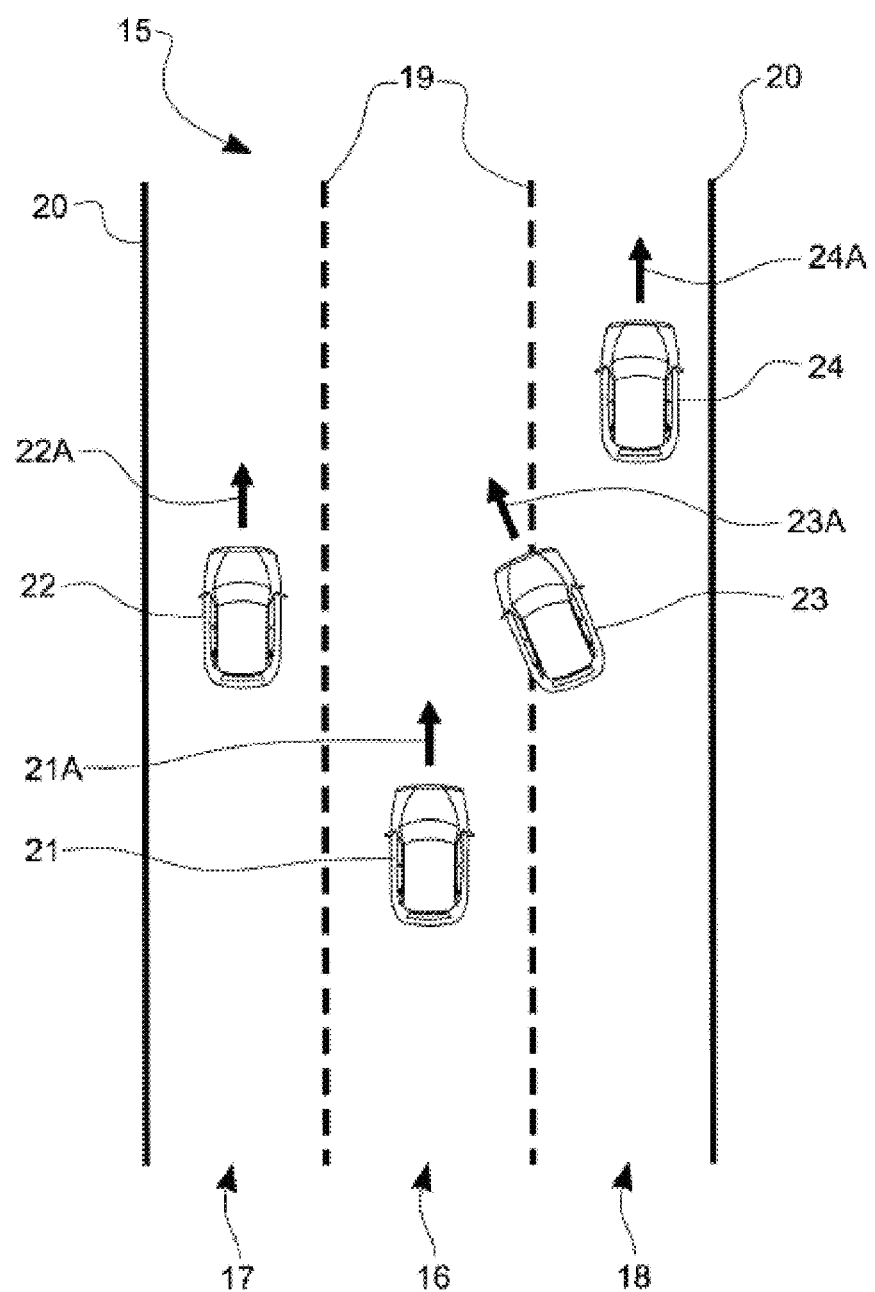
FIG. 2 shows a schematic bird's-eye view of a driving scenario.

FIG. 2 shows a bird's-eye view schematic of a typical driving situation on a road 15. The road 15 has three adjacent lanes along which traffic can travel: a central traffic lane 16, a left traffic lane 17 and a right traffic lane 18. The left traffic lane 17 is separated from the central traffic lane 16 by a lane marking 19; similarly, the right traffic lane 18 is separated from the central traffic lane 16 by another lane marking 19. The outer limit of the right traffic lane 17 is designated by a solid lane marking 20; similarly, the outer limit of the left traffic lane 18 is designated by another solid lane marking 20.

An ego vehicle 21 is shown travelling along the central traffic lane 16. The direction of travel of the ego vehicle 21 is shown by an arrow 21A. Three other vehicles, 22, 23, and 24 are also shown travelling along the road 15. The direction of travel 22A, 23A, 24A for each of the other vehicles 22, 23, 24 is also shown in FIG. 1.

Evidently, all of the vehicles shown in FIG. 2 are travelling in generally the same direction (upwards) as one another. Accordingly, the road 15 of FIG. 2 corresponds, for example, to half of a highway or motorway. A corresponding second half of the highway or motorway is not shown, but would be located to one side (either to the right or to the left, as seen in FIG. 2) of the road 15 (which side clearly depends on the country in which the road is located). The vehicles on the second half of the highway or motor would travel in generally the opposite direction to the vehicles on the road 15.

Figure 3:
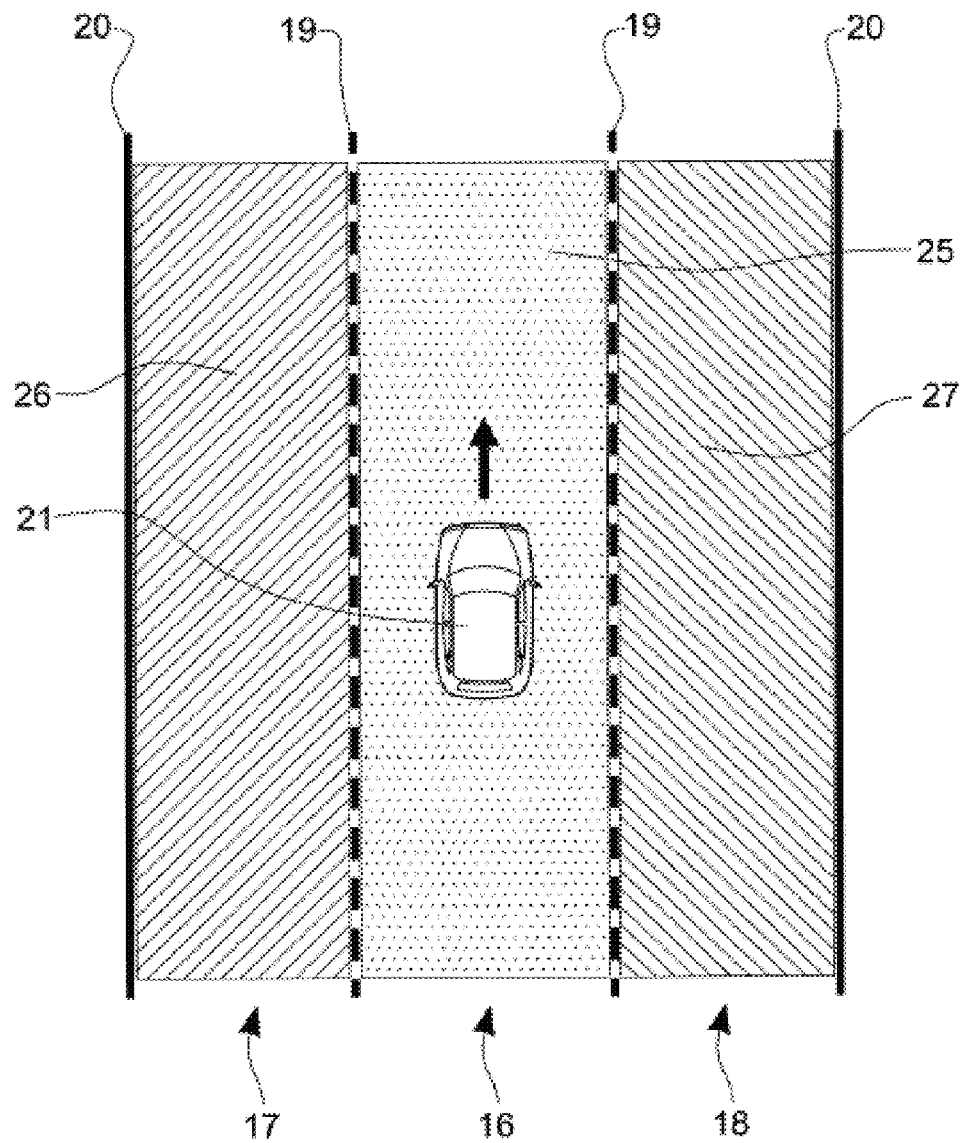
FIG. 3 shows a designated Region of Interest ("ROI") in accordance with the present invention.

FIG. 3 shows the ego vehicle 21 travelling along a road. The traffic lanes and road markings are as described in respect of FIG. 2. The ego vehicle 21 includes an apparatus according to the present invention.

As described above, the apparatus has searched for road markings using data from at least one of the sensors mounted to the ego vehicle 21. The apparatus has detected sections of the lane markings 19, 20. That is to say, in this example, four sections of lane markings 19, 20 have been detected. The four sections include a section of each of the central lane markings 19, and a section of each of the outer lane markings 20.

On the basis of the detected sections of the lane markings, the apparatus is configured to generate a Region Of Interest ("ROI") in the vicinity of the ego vehicle 21. The ROI includes an ROI ego lane 25, an ROI left lane 26, and an ROI right lane 27. In this example, the ROI ego lane 25 is effectively an area extending in front of, and behind, the ego vehicle in the central traffic lane (i.e. the lane in which the ego vehicle 21 is travelling). The ROI left lane 26 is effectively an area extending in front of, and behind, the ego vehicle in the left traffic lane (i.e. the road lane adjacent to the road lane in which the ego vehicle 21 is travelling). The ROI right lane 27 is effectively an area extending in front of, and behind, the ego vehicle in the right traffic lane (i.e. the lane adjacent to the road lane in which the ego vehicle 21 is travelling on an opposite side to the left lane). In the example shown in FIG. 3, the ROI ego lane 25, ROI left lane 26, and ROI right lane 27 correspond to drivable road lanes. However, this is not necessarily the case. Any of the ego lane 25, left lane 26, and/or right lane 27 could be undrivable in the real world. For example, on a two-lane road with two traffic lanes, a third drivable lane does not exist, however the three ROI lanes of the ROI are nevertheless generated. The same would be true for a single lane road; the ROI is always generated. At least one of the ROI lanes may also correspond to a traffic lane on the opposite side of the road to the ego vehicle, i.e. a lane of oncoming traffic.

Figure 4A:
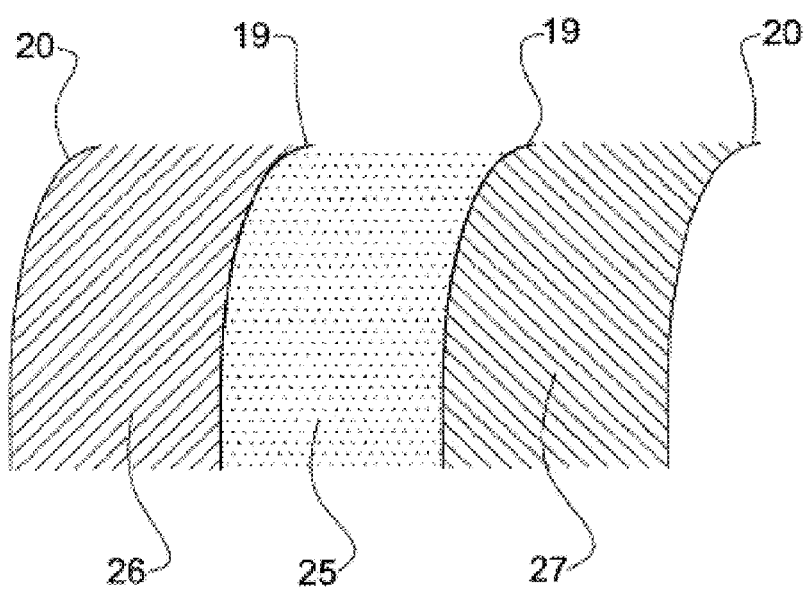
FIG. 4A shows a first scenario for the generation of an ROI in accordance with the present invention.

FIG. 4A is a schematic illustration of a first ROI generation scenario. Four lane markings 19, 20 have been detected by the apparatus. The ROI ego lane 25, ROI left lane 26, and ROI right lane 27 are generated to be located between those four detected lane markings. More specifically, the ROI ego lane corresponds to the area bounded by the right hand central lane marking 19 and the left hand central lane marking 19. The ROI left lane 26 corresponds to the area bounded by the left hand central lane marking 19 and the left hand outer lane marking 20. The ROI right lane 27 corresponds to the area bounded by the right hand central lane marking 19 and the right hand outer lane marking 20. The lane markings 19, 20 are curved because the road in this scenario curves to the right.

However, not all of the road markings which bound the ROI ego lane, ROI left lane, and ROI right lane need to be detected in order to generate the ROI ego lane, ROI left lane a ROI right lane.

Figure 4B:
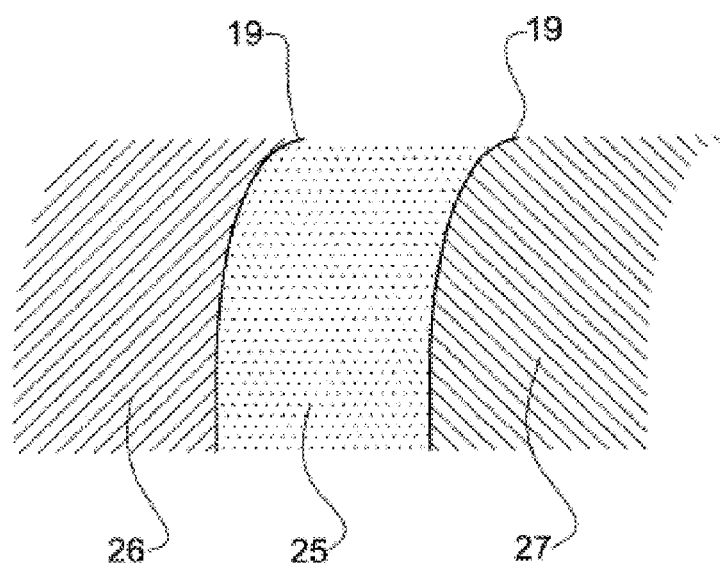
FIG. 4B shows a second scenario for the generation of an ROI in accordance with the present invention.

FIG. 4B is a schematic of a second ROI generation scenario. Two lane markings 19 have been detected by the apparatus; the left central lane marking and the right central lane marking. The two detected lane markings bound the ROI ego lane. Accordingly, the ROI ego lane 25 is generated between the two detected lane markings. The ROI left lane 26 is generated as a replication of the ROI ego lane with a lateral offset from the ROI ego lane (to the left, as illustrated in FIG. 4B). Correspondingly, the ROI right lane 27 is defined as a replication of the ROI ego lane with a lateral offset from the ROI ego lane 25 (the lateral offset is to the right, as illustrated in FIG. 4B). The magnitude of the lateral offset of the ROI right lane is equal to the magnitude of the lateral offset of the ROI left lane. The lateral offset may be equal to the width of the ROI ego lane.

Figure 4C:
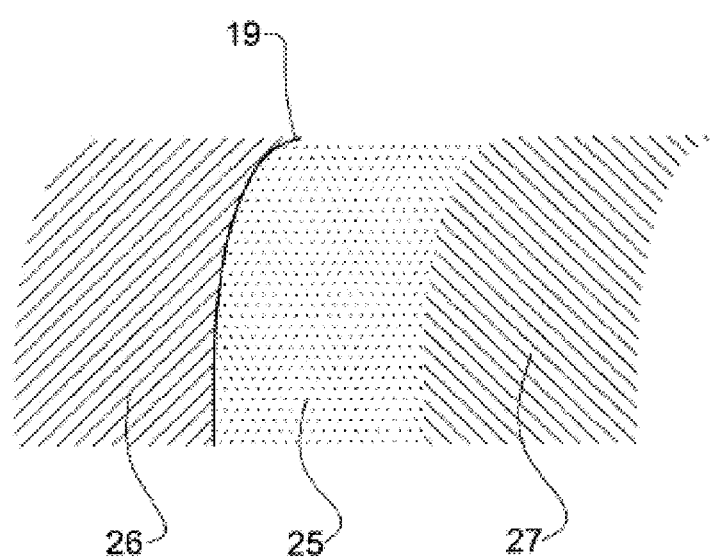
FIG. 4C shows a third scenario for the generation of an ROI in accordance with the present invention.

FIG. 4C is a schematic of a third scenario. The left central lane marking 19 has been detected by the apparatus. The single detected left central lane marking bounds the left edge of the ROI ego lane. The other edge of the ROI ego lane is a replication of the detected left central lane marking with a lateral offset from the detected lane marking 19. The lateral offset may be a static lane width. The static lane width may be equal to the standard width of a traffic lane. The ROI left lane 26 is defined as a replication of the ROI ego lane with a lateral offset from the ROI ego lane (to the left, as illustrated in FIG. 4B). Correspondingly, the ROI right lane 27 is defined as a replication of the ROI ego lane with a lateral offset from the ROI ego lane 25 (the lateral offset is to the right, as illustrated in FIG. 4B). The magnitude of the lateral offset of the ROI right lane may be equal to the magnitude of the lateral offset of the ROI left lane.

The apparatus may be configured to operate according to any one of the above three scenarios of FIGS. 4A, 4B, and 4C, depending on how many lane markings are identified.

If no lane markings are identified, then the apparatus may default to a standard operation mode. In the standard operation mode, an ROI ego lane is generated with a static lane width centered on the position of the ego vehicle. The curvature of the ROI ego lane is determined using ego vehicle parameters. The ego vehicle parameters may include at least the steering angle, the yaw rate and the velocity of the vehicle. For example, where the velocity is lower than a low threshold, the curvature of the ROI ego lane may be defined only by the steering angle. Where the speed is between the low threshold and a medium threshold, the curvature may be defined by the steering angle and the yaw rate. Where the speed is greater than the medium threshold, curvature may be defined by the yaw rate and the velocity. For example, the low threshold may be 12 kilometres per hour. For example, the medium threshold may be 30 kilometres per hour. The left ego lane and right ego lane may be generated as replications of the ROI ego lane with respective lateral offsets, as described above.

Figure 5:
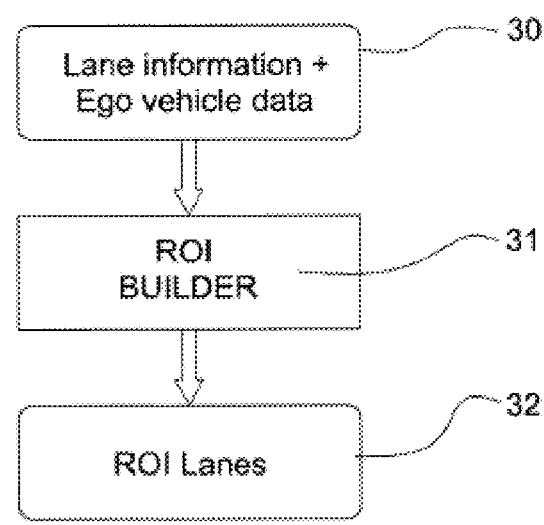
FIG. 5 illustrates schematically a method for the generation of an ROI in accordance with the present invention.

FIG. 5 illustrates a method implemented by an apparatus according to the present invention. The method includes input data 30, which is processed by the ROI builder 31, to generate ROI lanes 32.

The input data 30 may include lane information, the lane information describing all lane markings that have been detected. The lane marking information could be provided in a number of different formats. What is important is that the position of a respective lane marking in the real world is described by the lane information. The lane information may be an output of a Lane Fusion module, for example.

The input data 30 may also include ego vehicle data. The ego vehicle data may include parameters describing the current position of the ego vehicle and controls of the ego vehicle. For example, the vehicle yaw rate, the vehicle velocity, and the vehicle steering angle may be comprised in the ego vehicle data.

The input data may also include driver intention data. The driver intention data includes data that can be used to determine a maneuver the driver might make before he or she actually makes it. For example, the driver intention data may include whether the driver is using an indicator, which would be indicative of an impending turn or lane-change.

Figure 6:
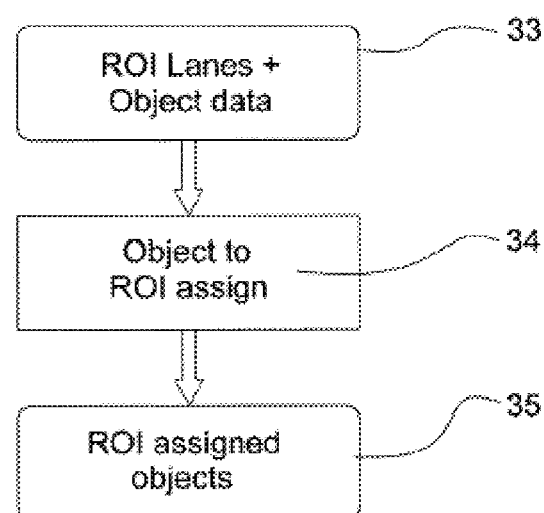
FIG. 6 illustrates schematically a method for the assignment of object to an ROI.

FIG. 6 illustrates a method that may be implemented by an apparatus according to the present invention. The flow includes ROI assignment input data 33, which is processed by the Object to ROI assignment process 34, to generate ROI assigned objects 35.

The input data 33 includes the ROI lanes, generated by the ROI builder illustrated in FIG. 5. The input data 33 also includes object data for each of a plurality of objects in the vicinity of the ego vehicle. The object path data may include an object history, which includes a historical record of the path of the respective object. The object data may also include an object path prediction for the respective object, which includes a prediction of the path that the respective object might travel in future. An object path prediction may include a likelihood of the object changing lanes (for example, from the ROI right lane or the ROI left lane to the ROI ego lane). The object data may also include the current position of the object. Objects are assigned to the ROI on the basis of the object data and the ROI lanes. In particular, each object is assigned to a particular ROI lane. For example, a particular object is assigned to one of the ROI ego lane, the ROI right lane, or the ROI left lane.

Figure 7:
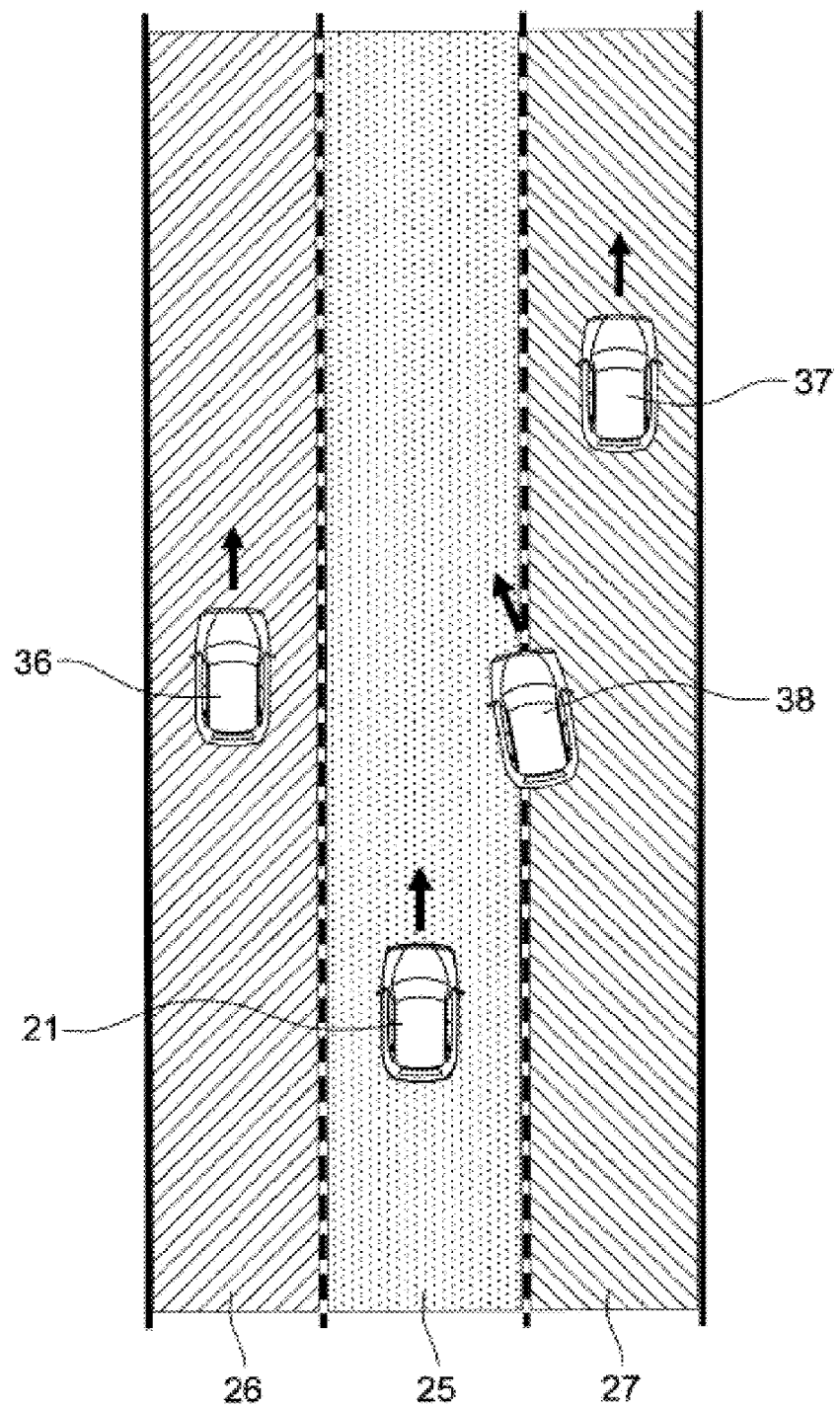
FIG. 7 shows a schematic bird's-eye view of a driving scenario in which objects have been assigned to an ROI.

Objects that are located outside the ROI may be discarded, ignored, or undergo no further processing in the apparatus. The apparatus may be configured to identify objects located outside the ROI, but subsequently to ignore them. FIG. 7 shows a schematic bird's eye view of a driving scenario after a number of objects have been assigned to the ROI according to the steps illustrated in FIG. 6. The ego vehicle 21 is shown driving along the central traffic lane of a road. The ROI ego lane 25, ROI left lane 26, and ROI right lane 27 have been generated as described above. Three other vehicles are shown in the vicinity of the ego vehicle 21:

A first vehicle 36, which has been assigned to the ROI left lane 26;

A second vehicle 37, which has been assigned to the ROI right lane 27;

A third vehicle 38, which has been designated as a lane-changing vehicle, the information assigned to the third vehicle may include the ROI lanes between which the third vehicle is changing. For example, the third vehicle is changing from the ROI right lane to the ROI ego lane. The third vehicle 38 may be initially assigned an ROI lane, but that lane may change as the third vehicle changes lane. In this example, the initially assigned ROI lane may be the ROI right lane 27.

The determination that a vehicle is a lane-changing vehicle may be based on a number of factors, including:
  A path prediction for the object; in other words, does an object path prediction include a transition between ROI lanes;
  The object lateral acceleration and/or object lateral velocity; in other words the component of velocity or acceleration in the direction of an adjacent ROI lane from the ROI lane in which the object is located is measured for an object, which can be used in the assessment of whether the object is lane-changing;
  The distance between the object and a line extending along the center of the ROI ego lane, for example if the vehicle is close to the center line, but assigned to the ROI right lane, then that may be indication that the vehicle is lane-changing from the ROI right lane to the ROI ego lane.

A vehicle changing between two ROI lanes may also be implemented by determining the time-period after a vehicle crosses a road marking that exists between the two ROI lanes. When the time-period exceeds a predetermined lane-change threshold, then it may be decided that the vehicle is changing lanes, or has changed lanes. The predetermined lane-change threshold may be between 1 and 4 seconds. For example, the predetermined lane-change threshold may be equal to 1.5 seconds.

Figure 8:
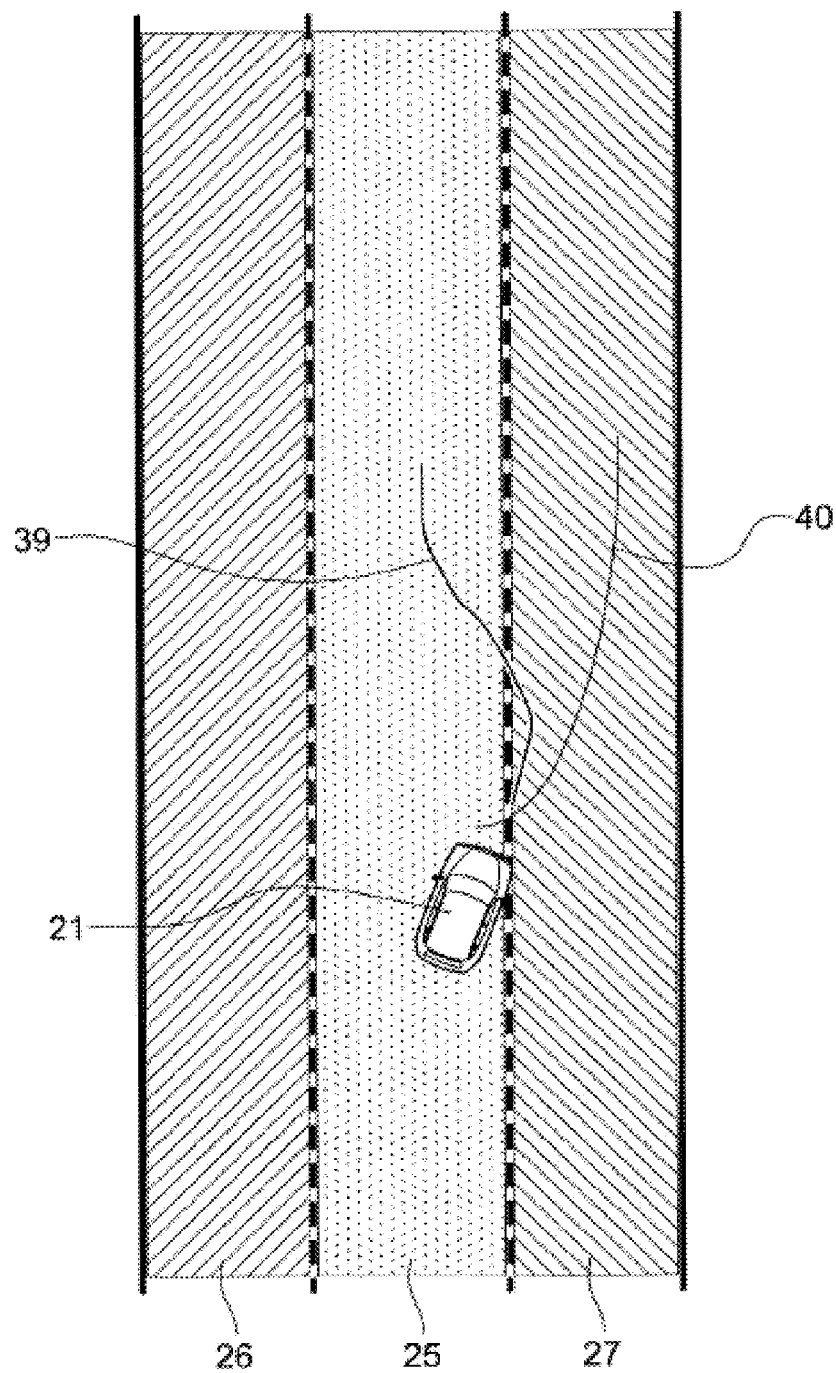
FIG. 8 shows a schematic bird's-eye view of a driving scenario illustrating a potential lane change of an ego vehicle.

The assignment of each vehicle in the vicinity of the ego vehicle 21 may be based on a number of factors, for example:
  Lane shape (for example, curvature);
  Lane width;
  Object position within the ROI;
  Object position history;
  Object path prediction;

FIG. 8 shows a schematic bird's eye view of a potential lane change scenario. The schematic illustrates how the apparatus may be configured to determine, and react to, a lane change by the ego vehicle 21. The ego vehicle 21 is initially driving along a central traffic lane. The ROI ego lane 25, ROI left lane 26, and ROI right lane 27 have been generated as described above. The ego vehicle data includes the vehicle yaw rate and steering angle, along with the respective positions of the ROI ego lane 25, ROI left lane 26 and ROI right lane 27. As the ego vehicle 21 begins to move away from the center of the ROI ego lane 25 (as shown in FIG. 6), there are two potential outcomes. An aborted lane change, shown by the aborted path 39, is a first option. A completed lane change, shown by the completed path 40, is a second option. The apparatus may be configured to detect a lane change. A lane change from the ROI ego lane, to the ROI right lane (for example), causes the previous ROI right lane to be reassigned as the ROI ego lane. The previous ROI ego lane becomes the ROI left lane and a new ROI right lane is generated. Of course, a corresponding ROI lane generation and reassignment operation is equally possible for a transition of the ego vehicle from the ROI ego lane to the ROI left lane.

Driver intention data may be used to determine the likelihood of a movement of the ego vehicle 21 away from the center of the ROI ego lane resulting in a completed lane change of the ego vehicle 21.

Figure 9:
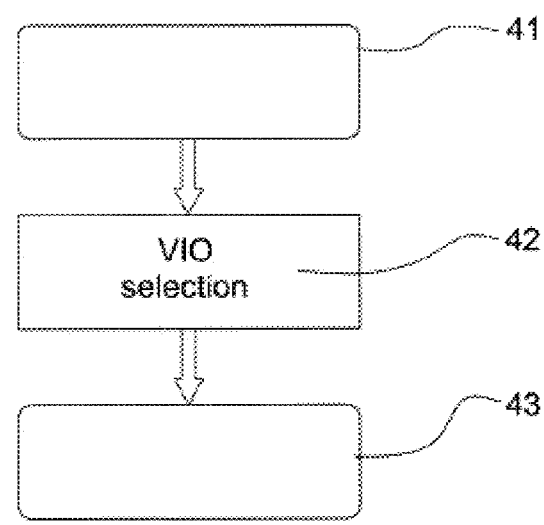
FIG. 9 illustrates schematically a method for the selection of Very Important Objects ("VIOs")

FIG. 9 illustrates a method that may be implemented by an apparatus according to the present invention. The flow includes VIO selection input data 41, which is processed by the VIO selection process 42, to form VIO selection output data 43.

The VIO selection input data 41 may include the objects that have been assigned to ROI lanes and the ROI lanes. The VIO selection process selects a subset of the assigned objects as VIO candidates, and may also select a different subset of the objects as stationary VIOs into a stationary VIO list.

A single VIO candidate may be selected from each ROI lane. The selected VIO candidates may be the closest objects to the ego vehicle. The closest object to the ego vehicle in each ROI lane may be selected as a VIO candidate. Multiple objects from each ROI lane may be selected as VIO candidates.

Each VIO candidate may be assigned a VIO candidate type. Seven VIO candidate types may be designated, for example:

Front, which means the closest object assigned to the ROI ego lane and located in front of the ego vehicle;

Ahead, which means an object assigned to the ROI ego lane and located immediately in front of the "Front" object;

Behind, which means a closest object assigned to the ROI ego lane and located behind the ego vehicle;

Front-left, which means a closest object assigned to the ROI left lane and located in front of the ego vehicle;

Front-right, which means a closest object assigned to the ROI right lane and located in front of the ego vehicle;

Rear-left, which means a closest object assigned to the ROI left lane and located behind the ego vehicle;

Rear-right, which means a closest object assigned to the ROI right lane and located behind the ego vehicle.

Each of the objects which are input into the VIO selection process may include a motion type parameter. Several potential values for the motion type parameter may be defined. For example:

Unknown, where the movement type is not known;

Driving, where the object is moving in the same direction as the ego vehicle;

Oncoming, where the object is travelling towards the ego vehicle;

Stopped, where the object is at a standstill, but has previously been seen moving and;

Reversing, where the object has previously been seen moving in the direction of ego vehicle, but is now moving the opposite direction.

Objects having one of these motion types may be entered in the VIO candidate list.

An object may also have a movement type of "stationary". Such objects may be entered into the stationary VIO list.

The VIO selection input data 41 may also include a vehicle type for each object. Example vehicle types may include "unknown", "car", "truck" and "trailer". Any of these vehicle types could be entered into the stationary VIO list or the VIO candidate list.

There may be a distance limit beyond which it is effectively not possible to determine vehicle type for an object. For objects beyond the distance limit, only the motion type of the object may be monitored and used in VIO selection. The distance limit may be dictated by the capabilities of the sensors on the ego vehicle. The distance limit may be 50 metres, for example.

Figure 10:
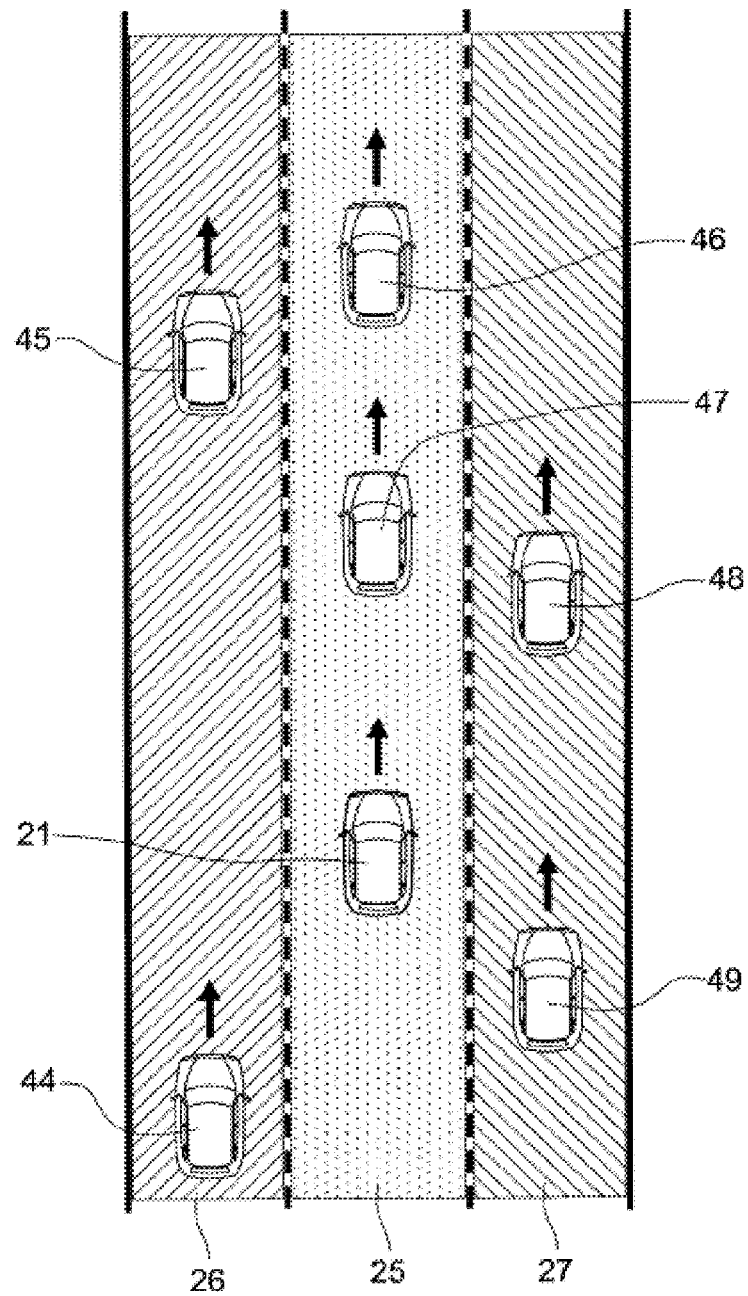
FIG. 10 shows a schematic bird's-eye view of a driving scenario illustrating vehicles assigned as VIOs.

FIG. 10 shows a schematic bird's eye view of another driving scenario. This scenario illustrates the selection of Very Important Objects ("VIOs") from the objects assigned to the ROI.

In FIG. 10, the ego vehicle 21 is driving along a central traffic lane of a road portion. The ROI ego lane 25, ROI left lane 26, and ROI right lane 27 have been generated as described above. Six other vehicles are shown also travelling on the road portion. The six vehicles are as follows:

A first VIO vehicle 44, which is a selected VIO candidate of the VIO type rear-left;

A second VIO vehicle 45, which is a selected VIO candidate of the VIO type front-left;

A third VIO vehicle 46, which is a selected VIO candidate of the VIO type ahead;

A fourth VIO vehicle 47, which is a selected VIO candidate of the VIO type front;

A fifth VIO vehicle 48, which is a selected VIO candidate of the VIO type front-right, and;

A sixth VIO vehicle 49, which is a selected VIO candidate of the VIO type rear-right.

The first to sixth vehicles are in the VIO candidate list. The VIO candidate list and/or the stationary VIO list can be used as inputs to downstream driver assistance/autonomous driving systems. Each downstream system can use the VIOs as required by the particular function of that system. Accordingly, the identification of VIOs is performed just once, by an apparatus according to the present invention. A vehicle fitted with such an apparatus can be controlled in a variety of ways on the basis of the ROI generation according to the present invention. The apparatus may be configured to send the VIOs (including the VIO candidate list and/or the stationary VIO list) to at least one downstream system. The apparatus may be configured to send the VIOs (including the VIO candidate list and/or the stationary VIO list) to more than one downstream system. The apparatus according to the present invention may be configured to make available the VIOs (including the VIO candidate list and/or the stationary VIO list) for downstream systems to access and use. The apparatus may be configured to calculate the distance of each object from the ego vehicle along the ROI lane to which the object is assigned. These distances may be used to select the VIOs.

Figure 11:
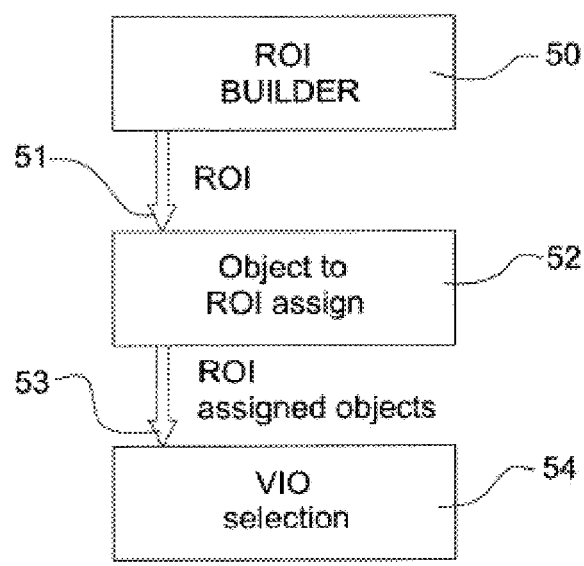
FIG. 11 illustrates schematically on overview of a method in accordance with the present invention.

FIG. 11 illustrates an overview of a method that may be implemented by an apparatus according to the present invention. The method begins with generating an ROI using an ROI builder 50 according to the method described above. An output 51 of the ROI builder includes the ROI (i.e. the ROI ego lane, ROI left lane and ROI right lane). The ROI lanes are input into an object to ROI assignment stage 52, in which detected objects located in the vicinity of the ego vehicle are assigned to the ROI. An output 53 of the ROI assignment stage 52 includes ROI assigned objects (i.e. objects that have been assigned to ROI lanes). The ROI assigned object are input into a VIO selection stage 54, in which a VIO candidate list and stationary VIO list is generated. These lists may then be used in autonomous driving and/or driver assistance systems to control the vehicle and/or produce interaction with a driver of the ego vehicle.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

While the above description constitutes the preferred embodiment of the present invention, it will be appreciated that the invention is susceptible to modification, variation and change without departing from the proper scope and fair meaning of the accompanying claims.

The invention claimed is:

1. An apparatus comprising:
a memory; and
a processor coupled to the memory, the processor configured to:
receive sensor data from at least one sensor;
detect lane markings on a road on which a vehicle travels using the sensor data from the at least one sensor;
establish a region of interest ("ROI") on the basis of at least one detected lane marking of the detected lane markings, wherein establishing the ROI includes:
determining a width based on the at least one detected lane marking;
generating an ROI ego lane based on the width, the vehicle being located in the ROI ego lane; and
generating at least one ROI adjacent lane on a side of the ROI ego lane;
identify a plurality of objects using data from at least one object sensor on the vehicle;
assign at least one of a plurality of objects to one of the ROI ego lane or the at least one ROI adjacent lane, each of the plurality of objects being located within a distance of the vehicle;
select a closest object to the vehicle from the assigned objects;
generate a candidate list as a subset of the list of objects, the candidate list including at least one object chosen from the assigned objects, wherein the candidate list contains the closest object to the vehicle in each of a plurality of regions; and
adjust an operational parameter of the ego vehicle based on the candidate list.

2. The apparatus according to claim 1 wherein the candidate list contains at least one object identified as a lane-changing object.

3. The apparatus according to claim 1 wherein each of the plurality of regions is a section of one of the ROI ego lane or the at least one ROI adjacent lane.

4. The apparatus according to claim 1 wherein the processor is further configured to send the candidate list to at least one advanced driving assistance apparatus.

5. The apparatus according to claim 1 wherein in the event that exactly one of the lane markings is identified, the location of the ROI ego lane is based on the exactly one of the lane markings.

6. The apparatus according to claim 5 wherein each of the at least one ROI adjacent lane is a replication of the ROI ego lane with a respective lateral offset from the ROI ego lane.

7. The apparatus according to claim 1 wherein in the event that the lane marking is detected, the location of the at least one ROI adjacent lane is based on the position of the lane marking.

8. The apparatus according to claim 1, wherein the processor is further configured to establish the ROI on the basis of a vehicle parameter in the event that no lane markings are identified.

9. The apparatus according to claim 8 wherein the vehicle parameter includes at least one of a vehicle velocity, a steering angle, and a yaw rate.

10. The apparatus according to claim 1 wherein each of the objects include a position of the object relative to the vehicle.

11. The apparatus according to claim 1, wherein the processor is further configured to: assign a vehicle type to the at least one object on the candidate list.

12. The apparatus according to claim 1, wherein the processor is further configured to: detect a lane-changing object as an object having crossed a road marking between the ROI ego lane and the at least one ROI adjacent lane for a length of time exceeding a predetermined lane-change threshold.

13. The apparatus of claim 1, wherein generating the at least one ROI adjacent lane comprises:
generating an ROI left lane on a left side of the ROI ego lane; and
generating an ROI right lane on a right side of the ROI ego lane.

14. The apparatus of claim 1, wherein the processor is further configured to transmit the candidate list.

15. The apparatus of claim 1, wherein the at least one sensor is a lane marking sensor on the vehicle.

16. The apparatus of claim 1, wherein the operational parameter is related to a blind spot monitoring function of the advanced driver assistance system.

17. The apparatus of claim 1, wherein the operational parameter is related to an adaptive cruise control function of the advanced driver assistance system.

18. The apparatus of claim 1, wherein the operational parameter is related to a lane departure protection function of the advanced driver assistance system.

19. The apparatus of claim 1, wherein the operational parameter is related to a collision prevention assistance function of the advanced driver assistance system.

20. A method for a motor vehicle driver assistance system, the method comprising the steps of:
receiving data from at least one sensor;
detecting lane markings on a road on which a vehicle travels using the sensor data from the at least one sensor;
establishing a region of interest ("ROI") on the basis of at least one detected lane marking of the detected lane markings, wherein establishing the ROI includes:
determining a width based on the at least one detected lane marking;
generating an ROI ego lane based on the, the vehicle being located in the ROI ego lane; and
generating at least one ROI adjacent lane on a side of the ROI ego lane;
identifying a plurality of objects using data from at least one object sensor on the vehicle;
assigning at least one of a plurality of objects to one of the ROI ego lane or the at least one ROI adjacent lane, each of the plurality of objects being located within a distance of the vehicle;

selecting a closest object to the vehicle from the assigned objects;

generating a candidate list as a subset of the list of objects, the candidate list including at least one object chosen from the assigned objects, the candidate list including the closest object to the vehicle in each of a plurality of regions; and adjusting an operational parameter of the ego vehicle based on the candidate list.

21. The method according to claim 20, further comprising:

assigning at least one of the objects to one of the ROI ego lane or the at least one ROI adjacent lane; and generating a stationary list as a subset of the list of objects, the stationary list including at least one object chosen from the assigned objects and which is stationary.

22. The method according to claim 20, further comprising:

assigning the at least one object on the candidate list with a candidate type based on a relative location of the at least one object relative to the vehicle.

23. The method according to claim 22, wherein:

generating the at least one ROI adjacent lane comprises:
generating an ROI left lane on a left side of the ROI ego lane; and
generating an ROI right lane on a right side of the ROI ego lane; and assigning the at least one object on the candidate list with the candidate type further comprises assigning the candidate type as one of:

front, being a closest object assigned to the ROI ego lane and located in front of the vehicle, ahead, being an object assigned to the ROI ego lane and located in front of a front object, behind, being a closest object assigned to the ROI ego lane and located behind of the vehicle, front-left, being a closest object assigned to the ROI left lane and located in front of the vehicle, front-right, being a closest object assigned to the ROI right lane and located in front of the vehicle, rear-left, being a closest object assigned to the ROI left lane and located behind the vehicle, and rear-right, being a closest object assigned to the ROI right lane and located behind the vehicle.

24. The method according to claim 22, further comprising assigning a vehicle type to the at least one object on the candidate list.

25. The apparatus according to claim 1, wherein the processor is further configured to: assign the at least one object on the candidate list with a candidate type based on a relative location of the at least one object relative to the vehicle.

26. The apparatus according to claim 25, wherein:

generating the at least one ROI adjacent lane comprises:
generating an ROI left lane on a left side of the ROI ego lane; and
generating an ROI right lane on a right side of the ROI ego lane; and assigning the at least one object on the candidate list with the candidate type further comprises assigning the candidate type as one of:

front, being a closest object assigned to the ROI ego lane and located in front of the vehicle, ahead, being an object assigned to the ROI ego lane and located in front of a front object, behind, being a closest object assigned to the ROI ego lane and located behind of the vehicle, front-left, being a closest object assigned to the ROI left lane and located in front of the vehicle, front-right, being a closest object assigned to the ROI right lane and located in front of the vehicle, rear-left, being a closest object assigned to the ROI left lane and located behind the vehicle, and rear-right, being a closest object assigned to the ROI right lane and located behind the vehicle.

* * * * *